Patented Dec. 16, 1941

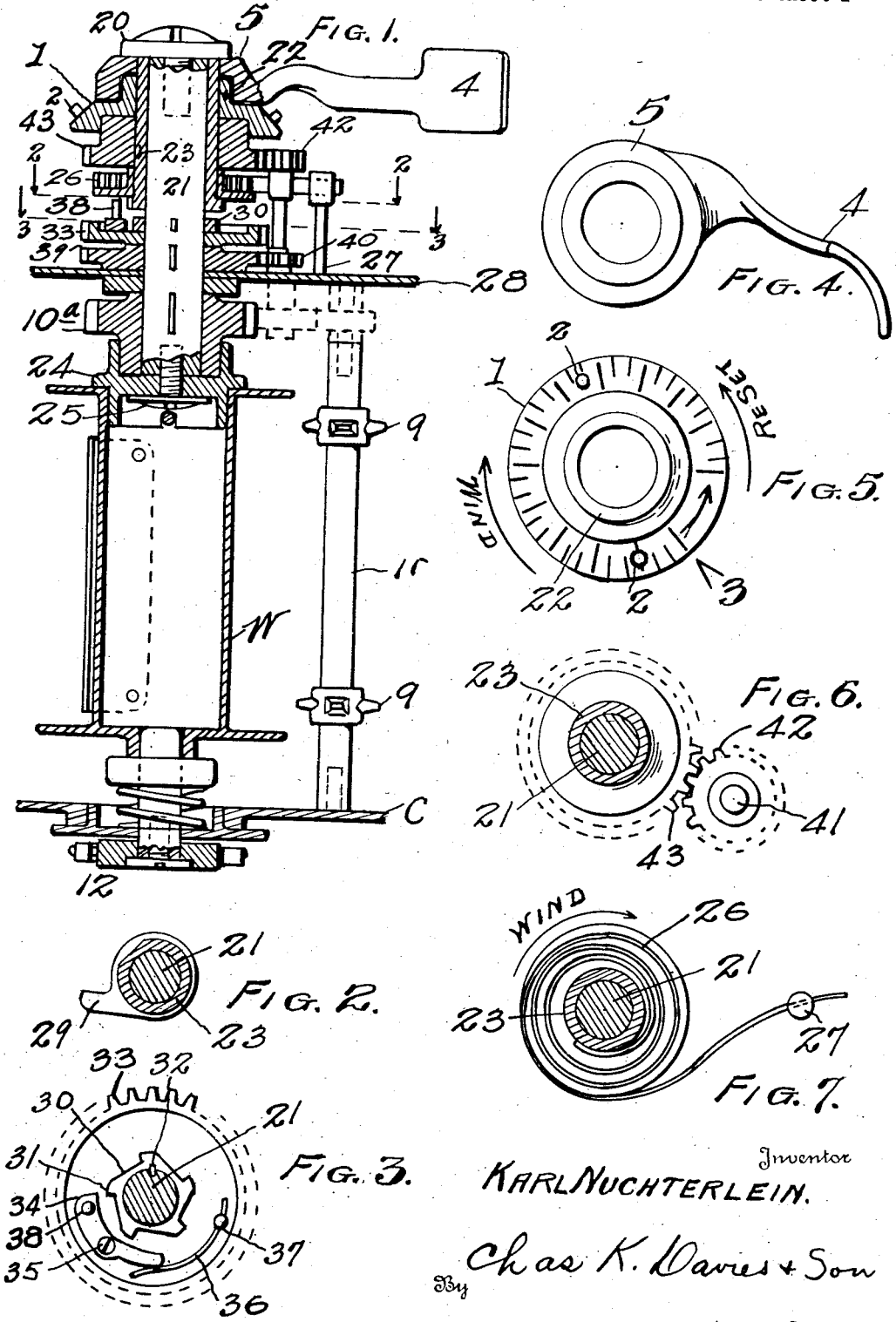

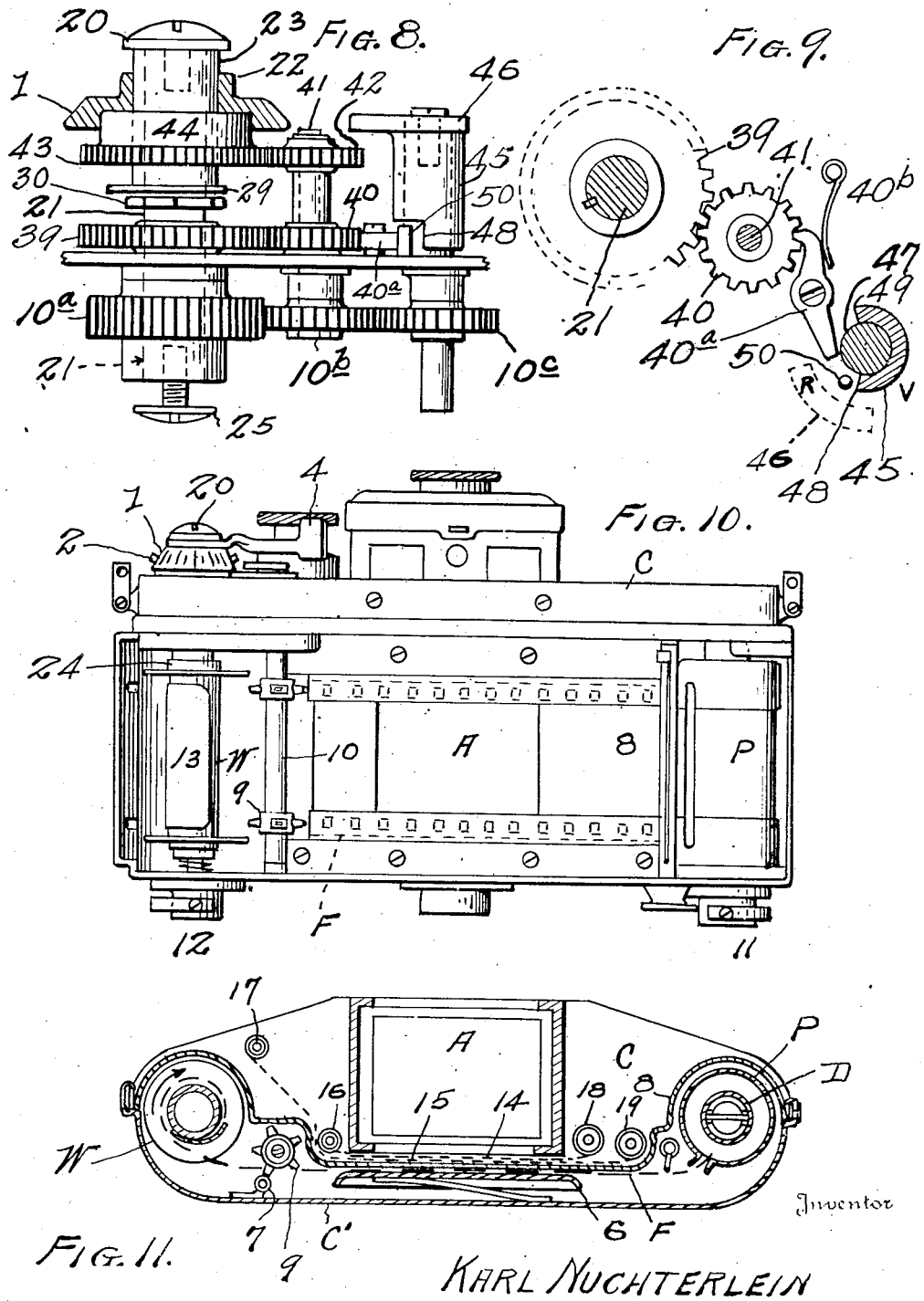

2,266,656

UNITED STATES PATENT OFFICE 2,266,656

INDICATOR FOR CAMERAS

Karl Nuchterlein, Dresden, Germany, assignor to Ihagee Kamerawerk Steenbergen & Co., Dresden, Germany Application September 28, 1937, Serial No. 166,205

3 Claims. (Cl. 95—31)

The present invention relates to an improved indicator for cameras by means of which the number of exposures of a roll-film are displayed, and the number of exposures remaining are also indicated. The indicator is of the rotary-dial type, and as here illustrated is especially adapted to and embodied in a camera utilizing a roll-film and pack of standard make, and the film feed mechanism of the camera co-operates with an automatically winding curtain-shutter. The indicator of my invention is combined with the film-feeding mechanism, the shutter-setting mechanism, and other operating parts of the camera, and it is especially adapted for use with the miniature type of camera.

The indicator is operated in connection with these essential parts of the camera by means of a single winding lever which sets the camera for taking a picture, and an operating lever (not shown) is employed to release the set mechanisms for picture-taking, as illustrated in my co-pending application for patent Ser. No. 123,904 of February 3, 1937, which has matured into Patent No. 2,180,064 of Nov. 14, 1939.

In the accompanying drawings:

Figure 1 is an enlarged detail vertical sectional view of the film-winding and shutter-setting driving-head with which the rotary indicator is combined or embodied, this view also showing the winding spool for the film.

Figure 2 is a plan view of the rotary clutch-actuator mounted on the main shaft or drive shaft of the driving or windinghead.

Figure 3 is a plan view of the clutch device, with the drive shaft in section, as at line 3—3 of Figure 1, the parts of the clutch being disengaged.

Figure 4 is a plan view of the operating or wind-lever with its hub.

Figure 5 is a plan view of the indicator or dial-disk, showing also its complementary stationary gage-mark, the disk being shown as set at zero.

Figure 6 is a detail sectional view through the main winding shaft and its sleeve, and showing the relation between a pinion and a gear of the indicator-operating mechanism.

Figure 7 shows the main shaft and its sleeve in section, with the automatic coiled spring which returns the winding lever to initial or normal position.

Figure 8 is a detail elevation, with parts in section, showing the rotary indicator and its operating parts, together with means for reversing the movement of the winding head, and also showing a gear-drive for an auxiliary film-winding reel.

Figure 9 is a horizontal sectional view of Figure 8 showing the ratchet device to prevent reverse movement of the winding-head and indicator, and showing also a device for releasing the ratchet to permit re-winding of the film.

Figure 10 is an elevation at the rear of the camera, with the detachable back-plate removed to disclose part of the interior arrangement of the camera, the film being indicated by dotted lines, and this view also shows the relative position of the winding lever exterior of the camera.

Figure 11 is a horizontal sectional view of the camera showing the central light chamber, and a rear dark-chamber with the film-pack and the winding-spool at opposite ends, together with the two automatically wound or spring-curtains of the shutter, and film-feeding auxiliaries.

Inasmuch as the indicator is operated in connection with the film-feeding mechanism, or winding mechanism, and the shutter-setting mechanism, through the instrumentality of a single winding-lever and a winding or driving-head, these mechanisms are illustrated in the drawings, and a brief description of them will assist in understanding the construction and operation of the rotary indicator.

In Figure 5 a plan view is shown of the rotary indicator or dial-disk 1, which is provided with two finger-pins 2, 2, for re-setting the indicator for a new film F, and in re-setting the indicator it is turned, manually, anti-clockwise in the direction of the "reset" arrow. The "wind" arrow indicates the clock-wise rotation of the indicator, with relation to the stationary or fixed zero mark or gage 3 which is displayed in suitable manner on the top face of the camera casing C. As here shown, the indicator has thirty-seven radial marks to define thirty-six spaces, and these thirty-six spaces correspond to the thirty-six exposures of the standard roll-film F. For each exposure the indicator is turned in the direction of the "wind" arrow through an arc one space less than 360 degrees, and there held. Thus, in Figure 5, upon the first exposure, the indicator is turned in the "Wind" direction, one space less than a complete circle, and therefore the second radial mark, instead of the first radial mark, stops at the gage-mark 3, to indicate the first exposure has been made. The winding lever 4 is turned to wind or feed the film, after each exposure, and the indicator turns with each of these operations, one space less than a complete circle, thus bringing succeeding marks into register with the stationary mark 3. The radial marks on the dial or indicator may be numbered, or the divisions may be shown in other suitable manner, but in the drawings, however, these numbers are omitted because of their extremely small size.

The lever 4 and the rotary indicator 1 are mounted exterior of the camera casing C, at the left end of the camera as seen from the rear, but the winding-head, film-feed, and other parts are enclosed within the casing.

The lever 4 through its hub 5 is mounted on the winding head, or driving-head for the film-feed and shutter-setting mechanism, and one full swing in a complete circle, or an approximately complete circle, will feed the film, set the shutter and operate the indicator, as will be described.

The casing C is provided with a removable back-wall C', the inner face of which is provided with a flat, resilient, presser plate 6, and a guide roller 7, for the film F. A standard type of film pack P, with its daylight spool D, is loaded into and unloaded from the dark chamber at the rear of the camera. The back wall C' forms one wall of this dark chamber, and an inner, longitudinally extending, vertical partition 8 forms the remaining walls of the dark chamber; the film-pack P being located at one end of the chamber and the winding spool W of the film being located at the opposite end, under the winding-head or driving-head.

As indicated in Figure 10, the standard roll-film F is provided with perforations or holes along its upper and lower edges, and in Figure 11 it will be seen that the film is fed from the pack P at the right to the winding spool W at the left between the presser plate and the partition, the exposure being made through the central light chamber A, and through an opening in the back wall of the chamber as well as through an opening through the partition 8, for that purpose.

The guide roller 7 is located adjacent a reel having star wheels 9, mounted on the shaft 10, to engage the perforations of the film and hold the film taut against buckling. This auxiliary guide for the reel is operated from the driving head or winding head through gear 10a, and pinions 10b and 10c, as indicated in Figures 1 and 8.

Both the daylight spool D within the film pack P, and the winding spool W may be manually operated in either forward or reverse direction by means of the respective, exterior, winding heads 11 and 12 at the underside of the camera, as indicated in Figure 10.

In loading the camera the outer end of the film is attached under the retaining shield or friction plate 13 of the spool W and the film is wound on the spool as the lever 4 is intermittently turned.

The shutter comprises a first or opening curtain 14 and a second or closing curtain 15, which flash successively across the rear of the camera, from left to right in Figure 11 to make an exposure. These curtains are wound upon the rollers 16 and 17 by the lever 4 through one of the gears of the driving head against the tension of springs in the automatically, spring-wound curtain-rollers 18 and 19, and when the "button" is pushed to take a picture, rollers 16 and 17 are released, and rollers 18 and 19 automatically wind the curtains. Each of these curtains has a light-opening which registers with the openings of the light-chamber and the dark-chamber of the camera, and the openings in the curtains form a slot through which the light flashes to expose a portion of the film for picture-taking.

The attaching hub 5 of the lever is firmly secured by screw 20 to the driving-head or winding-head, and the indicator disk 1 has an upper annular flange 22 that fits into a counter-sunk portion of the hub 5 with comparatively slight frictional engagement, so that the lever is free to turn relatively to the disk when permitted to do so.

The open center disk 1, as well as the hub 5 of the lever 4 are mounted on a sleeve 23 that is clamped by the screw 20, so that the lever is rigid with the sleeve, the screw being threaded into the upper end of a driving shaft or winding-shaft 21 of the winding-head. Thus the film-winding movement of the lever 4 is transferred through the sleeve, then through a clutch on the shaft 21, and thence through a double-flange coupling 24 and screw 25 to the winding spool W.

The sleeve has rigidly attached thereto one end of a coiled spring 26, and the other end of this spring is anchored to a fixed post 27 standing erect above and rigid with one of the interior frame plates 28 of the camera. Spring 26 is wound under tension on the working stroke or swing of the lever 4, and this spring automatically returns the lever to initial or normal position when the thumb or finger is released from the lever 4.

To transmit driving power from the sleeve 23 to the shaft 21 and to the disk 1, and also to prevent return or reverse movement of the winding spool W with the inactive or return stroke of the lever, I provide a clutch device between the sleeve and the shaft that is controlled by an actuating cam-arm 29 that is rigid with and projects laterally from the lower end of the sleeve.

The clutch comprises a driven member in the form of a toothed ratchet-disk 30 having teeth 31, which is keyed at 32 to the main shaft or winding shaft of the winding head. The driving member of the clutch is mounted on a gear 33, losely journaled on the shaft beneath the actuating cam-arm 29 of the sleeve, and this gear, through suitable mechanism operates the shutter-setting mechanism. In the upper, depressed or recessed face of this gear 33 a driving pawl 34 of the clutch is pivoted at 35 with its working end adapted to swing in toward the ratchet 30 as well as to swing outwardly from the ratchet. By means of a spring 36 anchored at 37 on the clutch gear 33, resilient means are provided for holding the pawl out of engagement with the ratchet-disk. An actuating pin 38 is mounted on top of the working end of the spring pressed pawl, and this pin projects upwardly into the path of the rotary cam-arm 29, so that as the arm turns clockwise it will engage the pin and draw inwardly the pawl to cause engagement of the pawl with the disk or ratchet 30, thus engaging the clutch. When the lever 4 is released and spring 26 revolves the sleeve 23 in reverse or anti-clockwise direction, the cam arm 29 is released from the pin 38, thus permitting spring 36 to swing the pawl 34 out of engagement with the clutch disk 30, to uncouple or disconnect the clutch.

The rotary winding movement of the main shaft 21 is transmitted to the rotary indicator dial-disk 1 from the shaft through a drive gear 39 keyed to the shaft beneath the clutch gear 33. This drive gear meshes with a one-way or ratchet-pinion 40 mounted on a spindle 41 that is journaled in upright position in one of the frame plates 28. Pinion 40 turns only in anti-clockwise direction when lever 4 is turned, and the ratchet-pinion is held against reverse, or clockwise turning by means of the spring-pressed ratchet-pawl 40a held in engagement therewith by a spring 40b. By means of this pawl and ratchet-pinion, after the spool W, through shaft 21, has been turned to feed the film, the spool and shaft are held against reverse movement, and the indicator also is retained stationary against reverse movement.

On its upper end the spindle 41 has a second pinion 42 that meshes with a gear 43 loosely journaled on the sleeve 23, above the coiled spring 26, and this gear has an integral friction disk 44 that fits snugly up within a recess in the lower face of the dial-disk or indicator 1. The friction between this friction-drive-disk and the indicator is sufficient to positively drive the indicator as the disk rotates under impulse of the working stroke of the lever 4, but the friction between the hub of the lever and the flange 22 of the indicator is not sufficient to form a drawing fit, as before explained.

As heretofore stated, the indicator turns through an arc that is one dial-space less in distance than a complete circle or a single rotation, and this lost distance is accomplished through lost motion between the gear 39 and pinion 40 and pinion 41 and gear 43, the ratios between the gear and pinion and the second pinion and second gear being predetermined with relation to the thirty-six spaces of the indicator. If the spaces of the indicator are increased, or decreased, as to their number, of course the ratios of the transmission gears and pinions will also be changed accordingly.

The friction drive disk 44 of the gear 43 rotates the indicator 1, and the latter moves concentrically with the hub of the lever, but at a slower speed and through a shorter distance.

After the full complement of exposures have been made, in this instance thirty-six, or after the film has been unloaded for any other reason, the indicator is again re-set, by hand, bringing the indicator back to position of Figure 5.

For the purpose of re-winding the film with its latent images into the film-pack before the latter is unloaded or withdrawn, the pawl or detent 40a is released from its ratchet pinion 40 in order that the driving-head and the winding spool W may be reversed as to their movement. It will be understood that the lever 4, sleeve 23, and spring 26 are not disturbed when the film is being re-wound from the spool back into the pack, but the re-winding is accomplished by use of the exterior hand-winding-heads 11 and 12.

At the back of the camera, within the casing C is mounted a tubular control key 45, and on the upper end of this key, exterior of the casing and adjacent the lever 4 is an integral arcuate shaped handle 46. On the top face of the casing C appear two letters R and V indicating respectively "reverse" and "advance" as related to the film F. When the key is turned so that its handle (dotted in Fig. 9) covers or obscures the letter R, the film is moving forward; and when the key is turned to the right in Fig. 9 to cover or obscure the letter V it will be understood that the film-winding mechanism is in condition to be reversed to permit re-winding of the latent images into the pack P.

The tubular key, as seen in Figures 8 and 9 is journaled to oscillate through an arc on a fixed post 47 rigid with a frame plate 28, and at its lower end, the tubular key is cut away to form spaced shoulders 48 and 49 that co-act with a stop pin 50, which pin is mounted on the plate in the path of movement of these shoulders.

As shown in Figure 9, when the winding-head is in condition to feed the film, the spring pressed pawl or detent 40a at its free end bears against the post 47. To release the pawl or detent from the ratchet-pinion 40, the tubular key is turned anti-clockwise until shoulder 49 contacts with the free end of the detent and swings the detent on its pivot from engagement with the pinion or ratchet 40. This turning of the key is accomplished by pushing on the handle 46 in the manner described. After the film has been re-wound, a fresh-roll film is substituted therefor, and of course the key is turned to bring the shoulder out of contact with the free end of the detent, whereupon the spring 40b forces the detent into engagement with the ratchet pinion 40.

Having thus fully described my invention, what I claim as new and desire to secure by Letters Patent is:

1. The combination in a film feeding mechanism for a camera with a one-way winding shaft, a sleeve rotatable on the shaft, means for turning the sleeve, and automatic means for returning the sleeve, of a rotary indicator disk loose on the sleeve, a clutch device between the sleeve and shaft and means for automatically actuating the clutch device after an initial movement of said shaft, a set of power-transmitting gears between the shaft and said disk, and the last of said gears having a friction-drive disk engaging said indicator disk, whereby said indicator is successively advanced to the next indicating position following the initial movement of said film feeding mechanism.

2. The combination with a one-way winding shaft, a sleeve loose on the shaft, means for turning the sleeve, a clutch device between the sleeve and shaft, means for automatically returning the sleeve, and means for retaining the shaft in operated position, of an indicator disk loose on the sleeve, a set of power-transmitting gears between the shaft and disk, and the last of said gears having a friction-disk in driving engagement with the indicator disk, whereby said indicator is successively advanced to the next indicating position following an initial movement of the winding shaft.

3. In a camera of the focal plane shutter type, the combination with a drive shaft, a film spool, and power transmitting connections therebetween, of a sleeve rotatably secured on said shaft and an operating lever therefor, an exposure indicator rotatably secured on said sleeve, a clutch member on said sleeve, a co-acting clutch member rotatably mounted on said shaft, a star wheel fixed on said shaft for cooperation with the second named clutch member, and means driven by said shaft for transmitting rotary movement to said indicator, after an initial rotary shaft movement.

KARL NUCHTERLEIN.